United States Patent [19]
Todd

[11] Patent Number: 5,370,584
[45] Date of Patent: Dec. 6, 1994

[54] PISTON DESIGN FOR REMOVING AIR FROM A HYDRAULIC TENSIONER

[75] Inventor: Kevin B. Todd, Freeville, N.Y.

[73] Assignee: Borg-Warner Automotive, Inc., Sterling Heights, Mich.

[21] Appl. No.: 4,926

[22] Filed: Jan. 15, 1993

[51] Int. Cl.⁵ .............................................. F16H 7/08
[52] U.S. Cl. ...................................... 474/110; 474/138
[58] Field of Search ............... 474/103, 104, 110, 118, 474/138

[56] References Cited

U.S. PATENT DOCUMENTS

| | | | |
|---|---|---|---|
| 3,574,418 | 4/1971 | Okabe . | |
| 3,626,776 | 12/1971 | Staudinger . | |
| 3,812,733 | 5/1974 | Yoshida . | |
| 3,960,026 | 6/1976 | Hibino | 474/110 |
| 3,964,331 | 6/1976 | Oldfield | 474/110 |
| 4,190,025 | 2/1980 | Wahl . | |
| 4,276,038 | 6/1981 | Kraft | 474/110 |
| 4,277,240 | 7/1981 | Kraft | 474/110 |
| 4,283,181 | 8/1981 | Sproul | 474/110 |
| 4,283,182 | 8/1981 | Kraft | 474/110 |
| 4,299,583 | 11/1981 | Kraft et al. | 474/110 |
| 4,504,251 | 3/1985 | Mittermeier | 474/110 |
| 4,507,103 | 3/1985 | Mittermeier | 474/110 |
| 4,674,996 | 6/1987 | Anno et al. | 474/110 |
| 4,708,696 | 11/1987 | Kimura et al. | 474/103 |
| 4,713,043 | 12/1987 | Biedermann | 474/111 |
| 4,826,470 | 5/1989 | Breon et al. | 474/110 |
| 4,874,352 | 10/1989 | Suzuki | 474/110 |
| 4,881,927 | 11/1989 | Suzuki | 474/110 |
| 4,894,047 | 1/1990 | Breon et al. | 474/110 |
| 4,902,266 | 2/1990 | Ojima et al. | 474/111 |
| 4,909,777 | 3/1990 | Inoue et al. | 474/110 |
| 4,911,679 | 3/1990 | Inoue et al. | 474/110 |
| 4,959,041 | 9/1990 | Ojima et al. | 474/111 |
| 4,963,121 | 10/1990 | Himura et al. | 474/110 |
| 4,985,009 | 1/1991 | Schmidt et al. | 474/110 |
| 4,986,796 | 1/1991 | Kawashima et al. | 474/101 |
| 4,995,854 | 2/1991 | Ojima | 474/111 |
| 5,030,169 | 7/1991 | Kiso et al. | 474/110 |
| 5,167,402 | 12/1992 | Nakakubo et al. | 474/110 |

FOREIGN PATENT DOCUMENTS 2065265A 6/1981 United Kingdom .

*Primary Examiner*—Roger J. Schoeppel
*Attorney, Agent, or Firm*—Willian Brinks Hofer et al.

[57] ABSTRACT

A hydraulic tensioner having a piston slidably fitted in a piston cavity and biased in a protruding direction by a spring and fluid. The piston is cylindrical and has a conical bottom surface. A check valve permits fluid to only flow into, and thereby protrude the piston, but not out of the cavity. Air may be vented out of the cavity through the clearance between the piston and the interior wall of the housing. This clearance is dimensioned so that air may be vented from the cavity without a significant loss of fluid. The conical bottom surface of the piston is configured to force any air present in the cavity to the clearance and thus out of the tensioner.

17 Claims, 3 Drawing Sheets

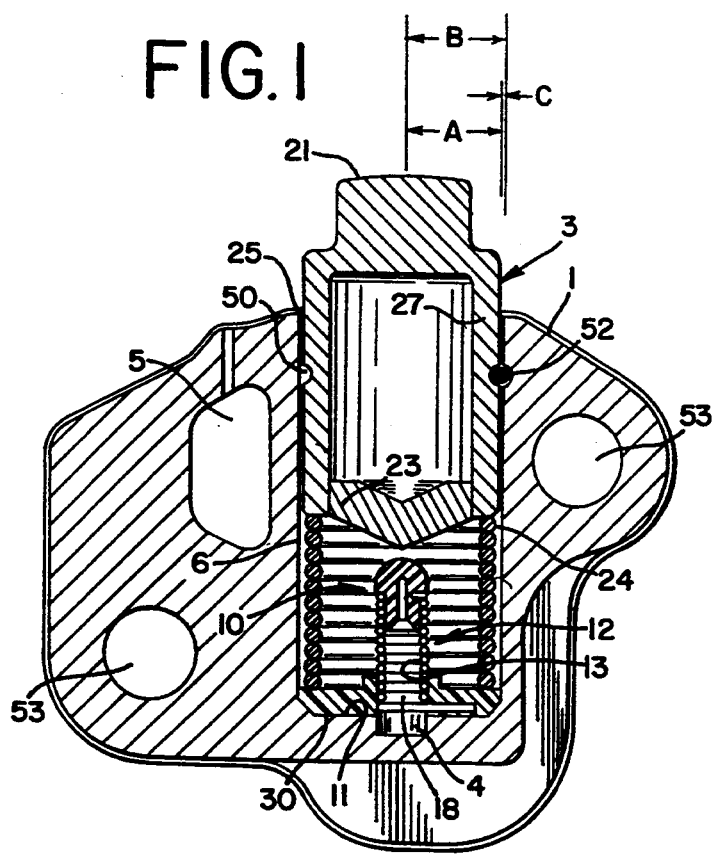
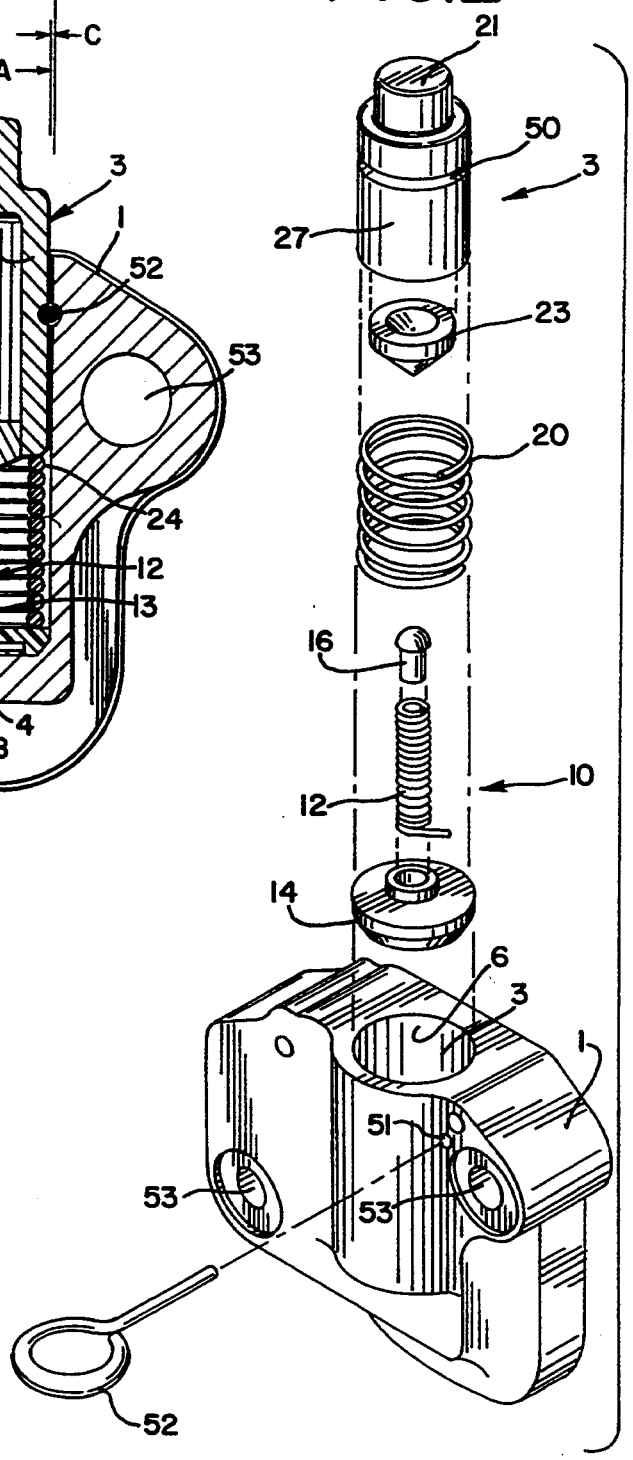

PISTON DESIGN FOR REMOVING AIR FROM A HYDRAULIC TENSIONER

The present invention relates to the subject matter of U.S. patent application Ser. No. 07/885,189, filed May 19, 1992, U.S. Pat. No. 5,259,820 entitled "Hydraulic Tensioner Having A Variable Orifice Check Valve And A Double Helix Internal Ratchet," which is incorporated herein by reference.

FIELD OF THE INVENTION

This invention relates to hydraulic tensioners which are useful for constantly imparting and maintaining tension to wrapped power transmission devices such as chains, belts and the like, and more particularly to a hydraulic tensioner having a piston design which assists in the removal of air from the piston cavity of the tensioner housing.

BACKGROUND OF THE INVENTION

Tensioning devices, such as hydraulic tensioners, are used as a control device for a power transmission chain, or any similar power transmission device, as the chain travels between a plurality of sprockets. Generally, it is important to impart and maintain a certain degree of tension to the chain to prevent noises, slippage, or the unmeshing of teeth in cases of a toothed belt.

Prevention of such slippage is especially important in the case of a chain driven camshaft in an internal combustion engine. In such an installation, chain slippage may throw off the camshaft timing by several degrees, possibly rendering the entire engine inoperative or causing damage. In the harsh environment in which an internal combustion engine operates, however, chain tension may vary between excessively high or low levels as a result of the wide variations in temperature as well as differences between the co-efficients of linear expansion among the various engine parts, including the chain and tensioner. Wear to chain components during prolonged use, moreover, can result in a decrease in chain tension. Thus, it is also necessary to provide some measures to remove excessive tensioning forces on the tight side of the chain as well as to ensure necessary tensioning forces are imparted on the slack side of the chain. Cam shaft and crank shaft induced torsional vibrations, furthermore, may cause belt tension to vary considerably. This tension variation may result in chain elongation, possibly rendering the entire engine inoperative.

One example of a device used to control tension in a wrapped power transmission device is described in Kimura et al., U.S. Patent No. 4,708,696. Kimura et al. discloses a hydraulic tensioner having a piston chamber and a piston biased by a spring in a protruding direction therefrom. A rod extends from the piston and the piston chamber to impart tension to a chain. The piston functions to separate the piston chamber into a first hydraulic fluid chamber and a second hydraulic fluid chamber. The first hydraulic fluid chamber is connected to the second hydraulic fluid chamber by a check valve mounted on the piston. The check valve permits fluid to freely flow from the first chamber to the second chamber as the piston protrudes the rod from the piston chamber. Thus, the hydraulic pressure of the fluid and the force exerted by the spring cause the rod to impart tension to a chain. On the other hand, chain tension may become greater than the combined force of the spring and hydraulic pressure. At this point, chain tension will tend to force the piston in the reverse direction, inwardly towards the piston chamber. The check valve, however, restricts the reverse flow of fluid from the second chamber to the first chamber. Due to the incompressibility of hydraulic fluid, the piston is thus limited in its reverse movement within the piston chamber. In such a fashion, the tensioner achieves a so-called no-return function, i.e., movements are easy in one direction but difficult in the reverse direction. A small clearance between the piston and the piston chamber wall, however, permits limited fluid flow between the second chamber to the first chamber. This allows the piston some limited movement in the reverse direction, i.e., to retract somewhat. This feature provides for excessive tensioning forces to be attenuated. Kimura et al. further discloses a system of passages connected to a diaphragm which prevent air from entering the piston chamber.

One of the problems associated with the use of such a hydraulic tensioner, however, is the venting of entrapped air from the piston chamber while the tensioner is operating. Air may enter the hydraulic fluid system and become entrapped within the piston chamber, on occasion, due to the variations in hydraulic fluid pressure or system leakage, for example. Venting such air from the piston chamber is important because air is much more compressible than hydraulic fluid. Thus, air, due to its compressibility, permits the piston to be forced further back into the piston chamber. Less tension is thereby maintained and possible chain slippage may result.

Accordingly, it is an object of the present invention to provide a tensioner for chain, belt or similar wrapped power transmission devices which can maintain a substantially constant tensioning force.

It is a further object of the present invention to provide a hydraulic tensioner which readily permits the venting of any air out from the tensioner.

SUMMARY OF THE INVENTION

According to one aspect of the present invention, there is provided a tensioner for a wrapped power transmission device, e.g., a chain linking at least two rotating members such as a pair of sprockets. A piston slidably fits within a piston cavity in a housing. The piston base, i.e., the side which fits within the piston cavity, is tapered or conical in shape. A spring is provided between the piston cavity and the piston base to bias the piston in a protruding direction towards the chain.

The present invention concerns a piston design for removing air from the hydraulic tensioner housing, and specifically from the piston cavity in the housing. Specifically the piston and piston cavity in the tensioner housing are dimensioned so that a vent is defined therebetween. The vent allows air trapped in the piston cavity to exit. The vent is dimensioned such that, due to the higher viscosity of hydraulic fluid compared to air, air may readily flow through the vent and exit but only an insubstantial amount of hydraulic fluid is permitted to flow through the vent. The piston features a tapered base. This design operates to transport air bubbles within the piston cavity to the vent and thus exit the piston cavity.

For a better understanding of these and other aspects and objects of the invention, reference should be made to the following detailed description taken in conjunction with the accompanying drawings.

BRIEF DESCRIPTION OF THE DRAWINGS

FIG. 1 is a sectional view of the hydraulic tensioner of the present invention.

FIG. 2 is an exploded perspective view of the hydraulic tensioner of the present invention.

DETAILED DESCRIPTION OF THE PRESENTLY PREFERRED EMBODIMENTS

Figure 3:
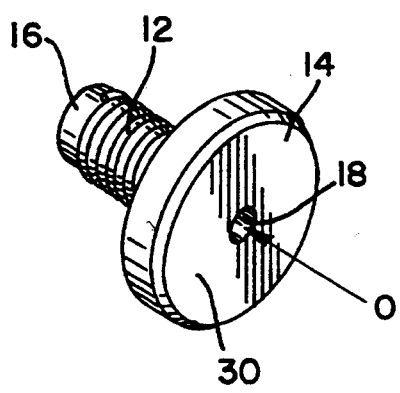
FIG. 3 is a perspective view of the cylindrical spring check valve of the hydraulic tensioner of the present invention showing the orifice through the bottom spring retainer portion and showing the spring coils in the normally mutually contacting condition wherein the valve is closed.

Turning now to the drawings, FIG. 1 depicts a sectional view of the present invention. As seen, the present invention is constructed from a housing 1 having a piston cavity 2 in which piston 3 is slidably mounted. Through passage 4 in cavity bottom 11, the piston cavity 2 and thus piston 3, communicate with a fluid reservoir chamber 5 in the housing 1. Check valve assembly 10, disposed on the cavity bottom 11, permits fluid to flow into, but not out of, piston cavity 2. Piston 3 slidably fits within the piston cavity 2 and is dimensioned to define a vent 25 therebetween. A spring 20, disposed in the lower half of the piston cavity 2, biases piston 3 outwardly from housing 1. The head 21 of piston 3 extends out from housing 1 to thereby provide tension to a chain (not shown.) The base 23 of the piston 3 has a tapered or conical shape. This shape assists in transporting any air bubbles within the piston cavity 2 to the volume 24 proximate the piston cavity wall 6. As discussed above, air may be present in the hydraulic fluid system and become entrapped within the piston cavity 2 due to pressure variations or system leakage. The piston 3 and cavity 2 are dimensioned so that the vent 25 defined therebetween permits the entrapped air to exit piston cavity 2 without a substantial loss of hydraulic fluid.

Figure 4:
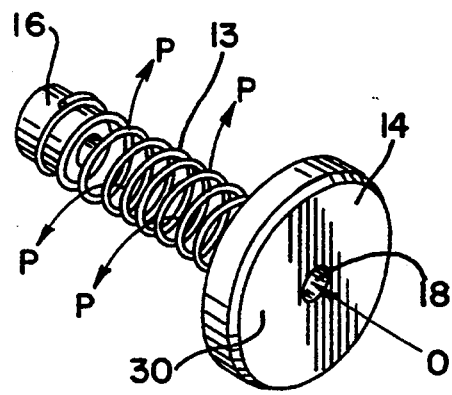
FIG. 4 is a perspective view of the cylindrical spring check valve portion of the present invention showing the spring coils in the expanded, non-contacting condition wherein the valve is opened.
Figure 5:
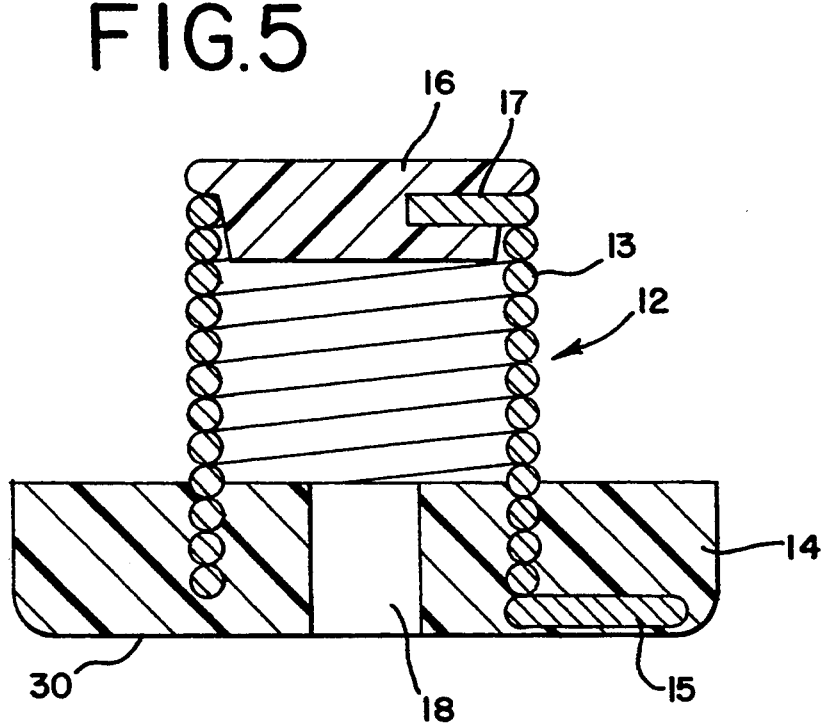
FIG. 5 is a sectional view of the cylindrical spring check valve depicted in FIG. 3.

FIGS. 3-5 detail the spring check valve assembly 10 used in the present invention. The preferred embodiment utilizes a cylindrical compression spring 12 in which coils 13 are normally in a mutually contacting condition wherein no gap exists between the coils 13. Thus no fluid may flow between the coils 13 and the valve is closed. Of course, other spring configurations may be used, such as one utilizing an expansion spring in which the coils of the spring 12 are normally in a mutually non-contacting condition so that a gap normally exists between the coils or one utilizing a frusto-conical compression spring.

The spring check valve assembly 10 is constructed from a cylindrical compression spring 12 having a bottom spring retainer 14 on its bottom portion 15 and a top spring cap 16 on its top portion 17. The bottom spring retainer 14 has an orifice 18 through it which allows fluid to flow from the volume proximate the bottom surface 30 of the bottom spring retainer 14 to the volume enclosed by the spring coils 13. Specifically, as best seen in FIG. 1, the orifice 18 is positioned to correspond to the passage 4 in the housing 1 when the spring check assembly 10 is positioned in the piston cavity bottom 11. The top spring cap 16 functions to seal the top portion 17 of the spring 12 from fluid leakage. Thus, because of the normally mutually contacting position of the spring coils 13, fluid which flows through orifice 18 into the volume bonded by spring coils 13, depicted by line O in FIG. 3, is prevented from escaping. However, upon attaining sufficient pressure, fluid within the volume bonded by spring coils 13 will force apart the coils 13, thereby allowing fluid to flow through the check valve assembly 10 as shown by lines P in FIG. 4.

Both the top spring cap 16 and bottom spring retainer 14 are, in the preferred embodiment, molded directly onto the ends of the compression spring 12. Any preferred method of affixing bottom spring retainer 16 and top spring cap 14 to spring coils 13 which is known in the art may be used. The preferred material for the bottom spring retainer 14 and top spring cap 16 is nylon. Further details of the construction and operation of a spring-type check valve for a hydraulic tensioner may be found in Mott U.S. patent application Ser. No. 07/885,189 filed May 19, 1992, U.S. Pat. No. 5,259,820 entitled: "Hydraulic Tensioner Having A Variable Orifice Check Valve And A Double Helix Internal Ratchet" and incorporated herein by reference.

As seen in FIG. 1, the piston 3 is constructed to assist in the removal of air from the piston cavity 2. As discussed above, the presence of air in the cavity 2 detrimentally effects the spring characteristics of the tensioner. Specifically, because air is more compressible than hydraulic fluid, the piston 3 may be more easily pushed back into the piston cavity 2 as the amount of air in the piston cavity 2 increases. Thus less tension will be provided to the chain.

The piston 3 is constructed from a piston body 27 capped at an end by a base 23. In the preferred embodiment the base 23 is conically shaped, and specifically is a tapered cone having a base to height ratio of approximately 3:1. Of course other tapered shapes, besides conical, may be used for the piston base 23 and still be within the scope of the invention. Other alternative embodiments, for example, may utilize a pyramidal, pointed, funnel-shaped or stepped construction. Because the tensioner is generally installed vertically, or near vertical, the tapered shape of the piston base 23 tends to transport any air bubbles present in the piston cavity 2 to the volume 24 proximate the piston cavity walls 6. As seen in FIG. 1, piston 3 and piston cavity 2 are dimensioned so that a gap or vent 25 is formed therebetween. In the preferred embodiment, A is equal to 9.5 millimeters and B is equal to 9.66 millimeters. Thus vent 25 or C is equal to 0.16 millimeters. Vent 25 is dimensioned to allow air to exit from piston cavity 2. Hydraulic fluid, however, due to its greater viscosity, is substantially prevented from exiting through vent 25.

The piston 3 preferably has a higher coefficient of linear expansion than that of the wall 6 of the piston cavity 2. This compensates for changes in viscosity of the hydraulic fluid with changes in temperature, and therefore reduces variations in the rate of retraction of the piston with changes in temperature. Preferably, the piston cavity wall 6 of the housing 2 and the piston 3 is constructed from steel.

Viscosity of a typical hydraulic fluid decreases as its temperature increases. Consequently, the flow rate of hydraulic fluid also increases. Therefore, if the piston clearance or vent decreases as the temperature of the hydraulic fluid increases, the reduction in hydraulic fluid viscosity and the reduction in the size of the vent offset each other. Thus, excessive flow of the hydraulic fluid through the vent is prevented. The offsetting action between viscosity, which is dependent upon temperature, and vent dimension, which is also dependent upon temperature, also occurs in the case of decreasing temperature.

Figure 7:
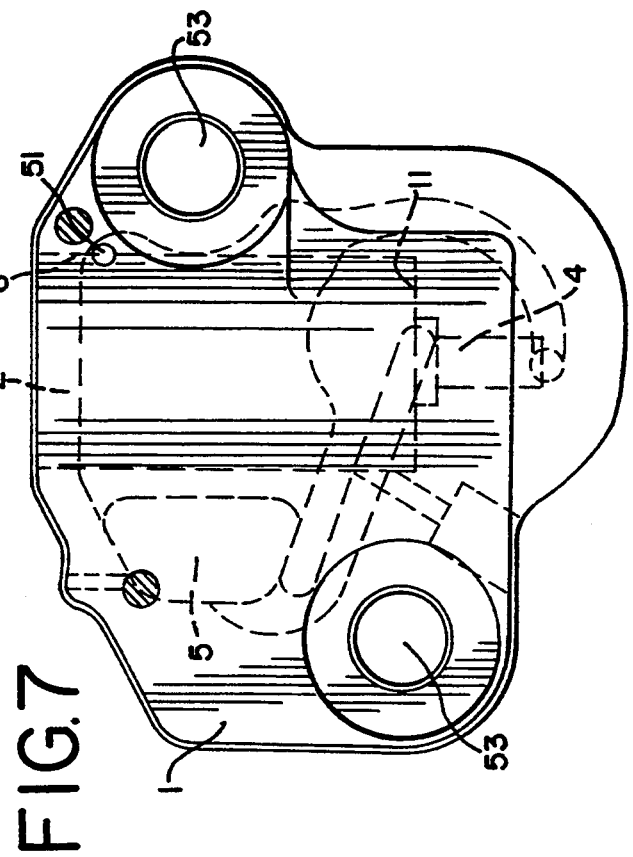
FIG. 7 is a side view of the housing of the hydraulic present invention showing in hidden lines the hydraulic fluid passageways.

FIG. 2 shows in perspective an exploded view of the preferred embodiment of the present invention. The housing 1 has piston cavity 2 having passage 4, as best seen in FIG. 7, allowing hydraulic fluid under pressure from reservoir chamber 5 to be introduced into piston cavity 2. The spring check valve assembly 10 is mounted in bottom 11 of the piston cavity 2. Through this configuration, passage 4 is subject to the spring check valve assembly 10, thereby allowing only hydraulic fluid to flow from the reservoir chamber 5 into the piston cavity 2 but not allowing a return flow outward. A biasing spring 20 is positioned, as best seen in FIG. 1, between piston 3 and bottom spring retainer 14.

The tensioner operates as follows: If a slack condition occurs to the chain (not shown) under driving conditions, piston 3 protrudes outwardly from housing 1 due to the biasing action of spring 20. The protrusion of piston 3 expands the volume of piston cavity 2, thus the pressure of any fluid in this volume is lowered. This causes a pressure differential across the spring check valve assembly 10 causing compression spring 12 to elongate, thereby supplying hydraulic fluid to the piston cavity 2 through passage 4 in housing 1. Thus, the fluid pressure within the piston cavity 2 is increased, thereby assisting spring 20 to protrude piston 3 from housing 1 and impart tension to the chain (not shown.)

Piston 3 is prevented from moving inwardly within housing 1 by the combined forces of spring 20 and hydraulic pressure. Specifically, spring check valve assembly 10 acts to prevent the outflow of hydraulic fluid from piston cavity 2. Because hydraulic fluid is substantially incompressible, retraction of piston 3 is prevented.

Figure 8:
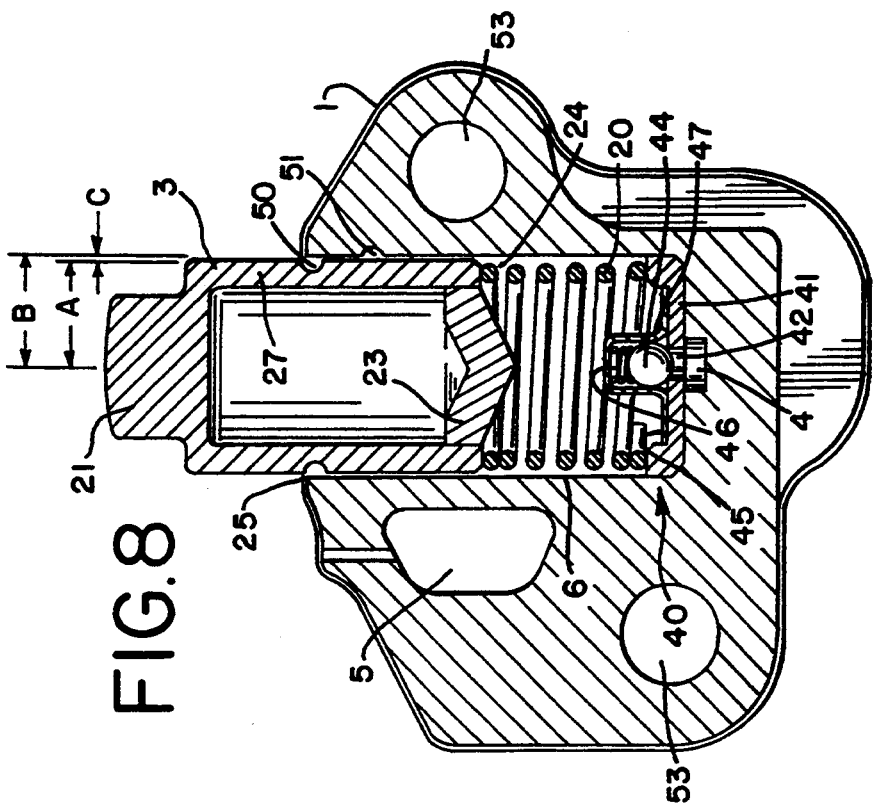
FIG. 8 is a sectional view of a second preferred embodiment of the present invention.

Removal of air from piston cavity 1 is accomplished through the conical base 23 of the piston 3 and the vent 25 formed between piston 3 and piston cavity 2. The tensioner typically is installed and operates in a vertical or near vertical position, as depicted in FIGS. 1 and 8. Air bubbles within the piston cavity 2, therefore, will be located proximate volume 24 due to the conical shape of piston base 23. Specifically, due to the near vertical orientation of the tensioner when in operation, air within the piston cavity 2 will rise to the top of piston cavity 2 proximate base 23 of piston 3. The tapered shape of base 23 will direct the air to volume 24 proximate vent 25. As detailed above, vent 25 is dimensioned to permit air to exit piston cavity 2 without allowing a substantial amount of hydraulic fluid to exit therewith.

FIG. 8 shows a second preferred embodiment of the present invention. This embodiment utilizes a ball-type check valve assembly 40 rather than a cylindrical spring check valve assembly 10. Other than this difference, all features and operation of this embodiment are the same as the previously described embodiment. Ball-type check valve assembly 40 is constructed from a ball seat 41 having an orifice 42. A ball 44 with a diameter larger than orifice 42 is seated on top side 45 of ball seat 41. A spring 46 is provided between cage 47 and ball 44 to bias ball 44 towards orifice 42. In such a fashion, ball 44, due to the bias of spring 46, normally obstructs orifice 42 so that fluid cannot flow through it, i.e., ball-type check valve assembly 40 provides the same function as spring type check valve assembly 10. Similarly, the tensioner of this second embodiment operates in the same way as the spring-type check valve tensioner discussed above.

Figure 6:
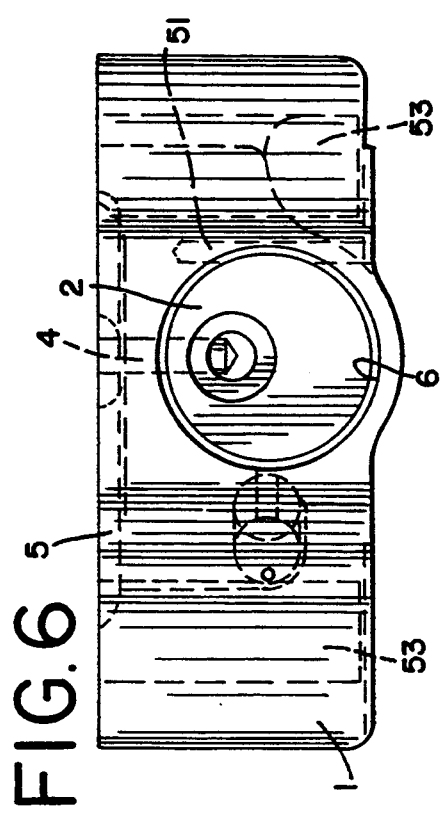
FIG. 6 is a top view of the housing of the hydraulic tensioner of the present invention.

Installation of the present invention is facilitated through a pin 52. Specifically, piston groove 50 is dimensioned to match with bore 51 tangential to the piston cavity 2 through housing 2, as best seen in FIG. 6. This configuration forms a cylindrical hole when the piston 3 is retracted into the cavity 2, as best seen in FIG. 1. Placement of pin 52 into bore 51 engages piston groove 50 and thereby prevents spring 20 from protruding piston 3 outward from housing 1. In such a fashion the piston 3 is secured into the housing 1 and may be installed onto the engine using mounting holes 53. Once installed, the pin 52 may be removed thereby allowing piston 3 to move freely and protrude from housing 1.

The above are two of the embodiments of the present invention as contemplated. Various changes and modifications may be made by those skilled in the art without departing from the spirit of the invention.

What is claimed is:

1. A hydraulic tensioner for a wrapped power transmission device between rotating members comprising:
   a housing with a fluid chamber, said fluid chamber communicating with a source of pressure, said housing having an exterior;
   a piston positioned within said fluid chamber, said piston defining a first passage along the outside of said piston, said first passage extending between said fluid chamber and said exterior, said piston having a first end and a second end, said first end of said piston capable of extending away from said fluid chamber and bearing against a power transmission device to regulate the tension between rotating members, said second end being tapered in shape to assist the flow of any air in said fluid chamber to said first passage;
   a spring biasing said piston in a direction toward said device; and
   a check valve positioned to allow the transfer of fluid from said source of pressure to said fluid chamber and to block fluid transfer from said fluid chamber to said source of pressure, said valve permitting the transfer of fluid from said source of pressure to said fluid chamber when said fluid in said fluid chamber achieves at least a first pressure.

2. The hydraulic tensioner of claim 1 wherein said check valve further comprises a compression spring having its coils in a normally mutually contacting position, said spring coils configured to move to a mutually non-contacting position when said fluid in said fluid chamber achieves at least said first pressure.

3. The hydraulic tensioner of claim 2 wherein said spring is a cylindrical shape.

4. The hydraulic tensioner of claim 1 wherein said tapered second end of said piston is conical.

5. The hydraulic tensioner of claim 2 wherein said spring contacts said second end of said piston.

6. The hydraulic tensioner of claim 1 wherein said check valve further comprises a ball-type check valve.

7. The hydraulic tensioner of claim 1 wherein said first passage is dimensioned to allow air to pass through said first passage without allowing a substantial amount of fluid to pass through said first passage.

8. The hydraulic tensioner of claim 7 wherein said fluid is hydraulic oil.

9. A hydraulic tensioner for a wrapped power transmission device between rotating members comprising:
a housing with a first chamber and a second chamber and an exterior, said second chamber communicating with an external source of pressure;
a piston positioned within said first chamber and capable of extending therefrom for bearing against a power transmission device to regulate the tensions between rotating members, said piston defining a first passage along the outside of said piston, said first passage extending between said housing exterior and said first chamber, said piston having a first end and a second end, said first end of said piston capable of extending away from said first chamber and bearing against a power transmission device to regulate the tension between rotating members, said second end being tapered in shape to assist the flow of any air in said first chamber to said first passage; and
a spring biasing said piston in a direction toward said device.

10. The hydraulic tensioner of claim 9 further comprising a check valve having resilient means positioned to allow the transfer of fluid from said second chamber to said first chamber and to block fluid transfer from said first chamber to said second chamber, said valve permitting the transfer of fluid from said second chamber to said first chamber when said fluid in said first chamber achieves at least a first pressure.

11. The hydraulic tensioner of claim 10 wherein said check valve further comprises a compression spring having its coils in a normally mutually contacting position, said spring coils configured to move to a mutually non-contacting position when said fluid in said first chamber achieves at least said first pressure.

12. The hydraulic tensioner of claim 11 wherein said spring is a cylindrical shape.

13. The hydraulic tensioner of claim 11 wherein said spring contacts said second end of said piston.

14. The hydraulic tensioner of claim 10 wherein said check valve further comprises a ball-type check valve.

15. The hydraulic tensioner of claim 9 wherein said first passage is dimensioned to allow air to pass through said first passage without allowing a substantial amount of fluid to pass through said first passage.

16. The hydraulic tensioner of claim 15 wherein said fluid is hydraulic oil.

17. The hydraulic tensioner of claim 9 wherein said tapered second end of said piston is conical.

* * * * *